(12) United States Patent
Carlson et al.

(10) Patent No.: US 12,248,570 B2
(45) Date of Patent: *Mar. 11, 2025

(54) SIDE-CHANNEL EXPLOIT DETECTION

(71) Applicant: Intel Corporation, Santa Clara, CA (US)

(72) Inventors: Paul Carlson, Santa Clara, CA (US); Rahuldeva Ghosh, Portland, OR (US); Baiju Patel, Portland, OR (US); Zhong Chen, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 17/739,930

(22) Filed: May 9, 2022

(65) Prior Publication Data

US 2022/0335127 A1  Oct. 20, 2022

Related U.S. Application Data

(63) Continuation of application No. 16/233,810, filed on Dec. 27, 2018, now Pat. No. 11,372,972.

(Continued)

(51) Int. Cl.
*G06F 21/56*   (2013.01)
*G06F 3/06*    (2006.01)
(Continued)

(52) U.S. Cl.
CPC .............. *G06F 21/56* (2013.01); *G06F 3/062* (2013.01); *G06F 3/0653* (2013.01);
(Continued)

(58) Field of Classification Search
None
See application file for complete search history.

(56) References Cited

U.S. PATENT DOCUMENTS

2004/0168046 A1   8/2004  Teruyama
2010/0332787 A1   12/2010 Grohoski et al.
(Continued)

OTHER PUBLICATIONS

Kocher, Paul, et al., Spectre Attacks: Exploiting Speculative Execution, 4oth IEEE Symposium on Security and Privacy {S&P'19)2018, 19 pages.

(Continued)

*Primary Examiner* — Yves Dalencourt
*Assistant Examiner* — Mohammad Yousuf A. Mian
(74) *Attorney, Agent, or Firm* — Alliance IP, LLC

(57) ABSTRACT

The present disclosure is directed to systems and methods for detecting side-channel exploit attacks such as Spectre and Meltdown. Performance monitoring circuitry includes first counter circuitry to monitor CPU cache misses and second counter circuitry to monitor DTLB load misses. Upon detecting an excessive number of cache misses and/or load misses, the performance monitoring circuitry transfers the first and second counter circuitry data to control circuitry. The control circuitry determines a CPU cache miss to DTLB load miss ratio for each of a plurality of temporal intervals. The control circuitry the identifies, determines, and/or detects a pattern or trend in the CPU cache miss to DTLB load miss ratio. Upon detecting a deviation from the identified CPU cache miss to DTLB load miss ratio pattern or trend indicative of a potential side-channel exploit attack, the control circuitry generates an output to alert a system user or system administrator.

25 Claims, 7 Drawing Sheets

Related U.S. Application Data

(60) Provisional application No. 62/645,097, filed on Mar. 19, 2018.

(51) Int. Cl.
*G06F 12/0802* (2016.01)
*G06F 21/62* (2013.01)
*G06F 21/75* (2013.01)
*G06N 20/00* (2019.01)

(52) U.S. Cl.
CPC ........ *G06F 3/0679* (2013.01); *G06F 12/0802* (2013.01); *G06F 21/6218* (2013.01); *G06F 21/755* (2017.08); *G06N 20/00* (2019.01); *G06F 2212/68* (2013.01); *G06F 2221/034* (2013.01)

(56) References Cited

U.S. PATENT DOCUMENTS

| | | | |
|---|---|---|---|
| 2013/0235544 A1* | 9/2013 | Tucker | H01L 23/49833 |
| | | | 174/262 |
| 2015/0058549 A1 | 2/2015 | Jeffrey et al. | |
| 2015/0293761 A1 | 10/2015 | Rabin | |
| 2016/0117254 A1 | 4/2016 | Susarla et al. | |
| 2017/0373955 A1* | 12/2017 | Kocoloski | G06F 9/4893 |
| 2018/0004670 A1 | 1/2018 | Sudhir et al. | |
| 2019/0114422 A1* | 4/2019 | Johnson | G06F 9/30105 |
| 2019/0272239 A1* | 9/2019 | Hagersten | G06F 12/0811 |
| 2020/0372129 A1* | 11/2020 | Gupta | G06F 9/3842 |

OTHER PUBLICATIONS

Lipp, Moritz el. al., Meltdown, 27th {USENIX} Security Symposium {{USENIX} Security 18), 2018, 16 pages.

* cited by examiner ized CPU cache miss to DTLB load miss ratio as a function of time as a system undergoes a side-channel exploit attack (Spectre), in accordance with at least one embodiment described herein;

SIDE-CHANNEL EXPLOIT DETECTION

CROSS-REFERENCE TO RELATED APPLICATIONS

This application is a continuation (and claims the benefit of priority under 35 U.S.C. § 120) of U.S. application Ser. No. 16/233,810, filed Dec. 27, 2018, and entitled "SIDE-CHANNEL EXPLOIT DETECTION," which application claims the benefit of U.S. Provisional Patent Application Ser. No. 62/645,097, filed Mar. 19, 2018, and entitled "Side-Channel Exploit Detection," the entire disclosure of which applications are incorporated herein by reference.

TECHNICAL FIELD

The present disclosure relates to computing system security, in particular relates to detection of side-channel exploits.

BACKGROUND

Side-channel attacks may induce a system to speculatively perform operations that would not occur during correct program execution and which leak private, confidential, and/or secret information. Other side-channel attacks break all of the assumptions inherent in address space isolation and exploits out-of-order execution to read arbitrary kernel memory locations that may include private, confidential, and/or secret information. Side Channel attacks communicate the illicitly obtained private, confidential, and/or secret information to an adversary via a side-channel. Operating system (OS) and central processing unit (CPU) microcode patch-based mitigations for CPU speculative execution based vulnerabilities have either been difficult to roll out in scale, require application recompilation, and/or introduce significant performance penalties, particularly for server workloads. All current solutions present difficulties in reliable deployment at scale and may have significant adverse impact on system performance in some applications. Thus, a reliable detection solution with a low false positive rate and presenting low performance overhead to the system would provide a viable solution for system administrators.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
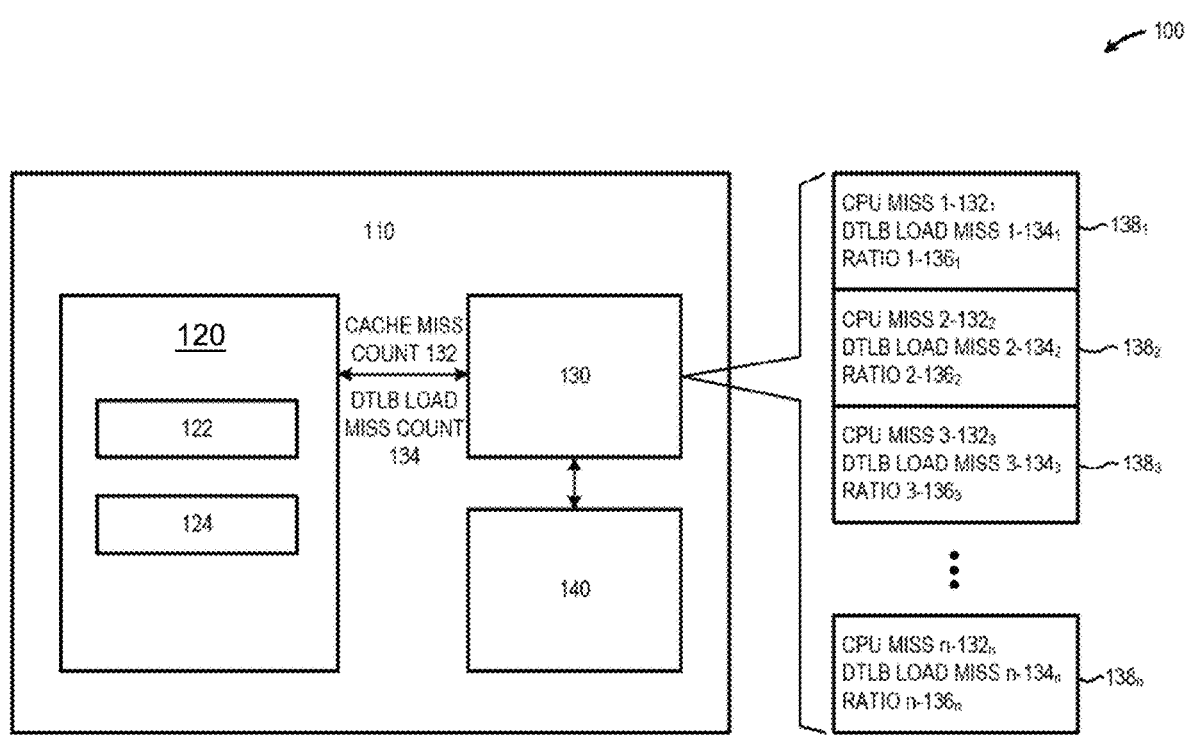
FIG. 1 is a block diagram of a system that includes illustrative central processing unit (CPU) that includes performance monitoring circuitry, control circuitry, and machine learning circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein beneficially and advantageously detect side-channel attacks such as Spectre and Meltdown by detecting changes in the ratio of a CPU cache miss counter to the dual or data translation lookaside buffer (DTLB) load miss counter. Control circuitry within a system CPU receives data representative of the CPU cache miss count and the DTLB load miss count. The control circuitry determines a value representative of a ratio of the CPU cache miss counter to the data translation lookaside buffer (DTLB) load miss counter for each of a plurality of time intervals. The control circuitry detects a pattern or determines a trend in the CPU cache miss to DTLB load miss ratio. Deviations from the detected pattern or determined trend cause the control circuitry to generate output indicative of a potential side-channel exploit attack, such as Spectre or Meltdown. The systems and methods described herein advantageously reduce the false positive rate of systems and methods that track only the CPU cache miss rate or count.

Even more beneficially, the CPU cache miss counter circuitry and the DTLB load miss counter circuitry used by the systems and methods described herein are often available as CPU performance monitoring circuitry and thus, require minimal additional processor software, firmware, and/or overhead. For example, Intel® CPUs typically include a Performance Monitoring Unit (PMU) that includes both CPU cache miss counter circuitry and DTLB load miss counter circuitry. Specifically, the PMU found in Intel® CPUs include both a CYCLE_ACTIVITY.STALLS_L3_MISS counter that provides the CPU cache miss counter circuitry and a DTLB_LOAD_MISSES.WALK_PENDING counter that provides the DTLB load miss counter circuitry. Upon detecting an event such as a counter overflow by either or both CPU cache miss counter and/or the DTLB load miss counter, the PMU generates an interrupt that causes the transfer of CPU cache miss counter data and DTLB load miss counter data to the control circuitry.

Upon receipt of the CPU cache miss counter data and the DTLB load miss counter data from the performance management circuitry, the control circuitry determines a counter correlation ratio using the two values according to the following expression:

$$\text{Counter Correlation Ratio} = \text{CPU Cache Miss Count} / (\text{CPU Cache Miss Count} + \text{DTLB Load Miss Count}) \quad (1)$$

The control circuitry determines the ratio for each of a plurality of time intervals and detects the pattern or determines the trend in the ratio data. Pattern deviations and/or statistically significant trend deviations provide an indication of a potential side-channel exploit attack.

The systems and methods described herein beneficially and advantageously have demonstrated a high efficiency in reliably detecting side-channel exploit attacks, such as Spectre and Meltdown, including the more recent prime+probe variants. Further, the systems and methods described herein provide false positive resiliency to various and typical stress workloads, on both the client and server sides. The systems and methods described herein do not require operating system updates, CPU code updates and application recompilation with new toolchains. Thus, the systems and methods described herein are more readily and effectively deployed at scale and provide minimal impact on system and/or processor performance. The systems and methods described herein further have improved reliability and reduced false positive rates than operating system and/or application-based software solutions. Thus, the systems and methods described herein beneficially improve the speed and reliability of the host system while solving the technical problem of detecting side-channel exploit attacks in a manner that minimally compromises system performance.

The systems and methods described herein take advantage of the significantly higher ratio of CPU cache misses to DTLB load misses that indicate a potential side-channel exploit attack. Thus, the systems and methods described herein significantly differ from solutions that depend on detecting a surge in CPU cache misses to successful CPU cache loads. Systems using a ratio of CPU cache misses to successful CPU cache loads are prone to false positives, particularly in input/output and just-in-time compilation intensive applications. The systems and methods described herein detect a surge in the CPU cache misses to DTLB load misses ratio and is therefore reliably distinguishable to side-channel exploit attacks which exhibit this behavior over the duration of their execution. In contrast, legitimate applications are often optimized to typically experience cache misses in correlation to TLB misses, e.g. app start, data load, keeping the ratio stable over their execution length. The systems and methods described herein thus provide a highly reliable detection solution for scenarios where mitigation is undesirable due to deployment complexity or performance overhead.

Speculative execution based side-channel exploits utilize cache timing attacks to infer data from victim processes. The exploit will put the cache in a known state and then time data access operations to detect a change in the cache state which leads to a surge in cache misses. The systems and methods described herein use the fact that even though these exploits can manipulate the cache state, such as by flushing the cache, the exploits do not have privileges to manipulate the Data Translation Lookaside Buffer (DTLB) from the user space. Our solution detects this behavior by sampling the following PMU counters: CYCLE_ACTIVITY.STALLS_L3_MISS; and DTLB_LOAD_MISSES.WALK_PENDING at a reasonable rate and calculating the ratio of the two according to equation 1 (above). This ratio is tracked over a plurality of temporal intervals (e.g., 50 millisecond intervals) and an unusual surge in the ratio may indicate a side-channel exploit attack in progress. Side-channel exploit attack detection may be enhanced by training, via machine learning, the control circuitry using the ratio data and employing one or more models to infer exploit execution in real time.

A central processing unit (CPU) is provided. The CPU may include: performance monitoring circuitry that includes: first counter circuitry to provide a first value that corresponds to a number of CPU cache misses that occur over each of a plurality of time intervals; and second counter circuitry to provide a second value that corresponds to a number of data translation lookaside buffer (DTLB) load misses that occur over each of the plurality of time intervals. The CPU may further include control circuitry to: receive from the performance monitoring circuitry data representative of the first value and data representative of the second value; calculate a CPU cache miss/DTLB load miss ratio based on the first value divided by the sum of the first value and the second value; identify a trend based on the CPU cache miss/DTLB load miss ratio over the plurality of time intervals; and generate an output indicative of a side channel exploit execution responsive to an identification of a deviation in the trend based on the CPU cache miss/DTLB load miss ratio.

A central processing unit (CPU) side-channel exploit detection method is provided. The method may include: generating, by first counter circuitry, a first value that corresponds to a number of CPU cache misses that occur over each of a plurality of time intervals; generating, by second counter circuitry, a second value that corresponds to a number of data translation lookaside buffer (DTLB) load misses that occur over each of the plurality of time intervals; receiving, by control circuitry, data representative of the first value and data representative of the second value; determining, by the control circuitry, a CPU cache miss/DTLB load miss ratio based on the first value divided by the sum of the first value and the second value; identifying, by the control circuitry, a CPU cache miss/DTLB load miss ratio trend over the plurality of time intervals; detecting, by the control circuitry, a deviation in the CPU cache miss/DTLB load miss ratio trend; and generating, by the control circuitry, an output indicative of a potential execution on of a side-channel exploit responsive to detection of the deviation in the CPU cache miss/DTLB load miss ratio trend.

A side-channel exploit detection controller is provided. The controller may include: control circuitry; and a storage device coupled to the control circuitry, the storage device including machine-readable instructions that when executed by the control circuitry, cause the control circuitry to: receive, from first counter circuitry, data representative of a first value that corresponds to a number of CPU cache misses that occur over each of a plurality of time intervals; receive, from second counter circuitry, data representative of a second value that corresponds to a number of data translation lookaside buffer (DTLB) load misses that occur over each of the plurality of time intervals; determine a CPU cache miss/DTLB load miss ratio based on the first value divided by the sum of the first value and the second value; identify a CPU cache miss/DTLB load miss ratio trend over the plurality of time intervals; detect a deviation in the CPU cache miss/DTLB load miss ratio trend; and generate an output indicative of a potential execution on of a side-channel exploit responsive to detection of the deviation in the CPU cache miss/DTLB load miss ratio trend.

A non-transitory machine-readable storage device is provided. The non-transitory machine-readable storage device may include instructions that, when executed by the control circuitry, cause the control circuitry to: receive, from first counter circuitry, data representative of a first value that corresponds to a number of CPU cache misses that occur over each of a plurality of time intervals; receive, from second counter circuitry, data representative of a second value that corresponds to a number of data translation lookaside buffer (DTLB) load misses that occur over each of the plurality of time intervals; determine a CPU cache miss/DTLB load miss ratio based on the first value divided by the sum of the first value and the second value; identify a CPU cache miss/DTLB load miss ratio trend over the plurality of time intervals; detect a deviation in the CPU cache miss/DTLB load miss ratio trend; and generate an output indicative of a potential execution on of a side-channel exploit responsive to detection of the deviation in the CPU cache miss/DTLB load miss ratio trend.

A central processing unit (CPU) side-channel exploit detection system is provided. The system may include: means for generating a first value that corresponds to a number of CPU cache misses that occur over each of a plurality of time intervals; means for generating a second value that corresponds to a number of data translation lookaside buffer (DTLB) load misses that occur over each of the plurality of time intervals; means for determining a CPU cache miss/DTLB load miss ratio based on the first value divided by the sum of the first value and the second value; means for identifying a CPU cache miss/DTLB load miss ratio trend over the plurality of time intervals; means for detecting a deviation in the CPU cache miss/DTLB load miss ratio trend; and means for generating an output indicative of a potential execution on of a side-channel exploit responsive to detection of the deviation in the CPU cache miss/DTLB load miss ratio trend.

An electronic device is provided. The electronic device may include: a printed circuit board; and a central processing unit (CPU) coupled to the printed circuit board, the CPU may include: performance monitoring circuitry that includes: first counter circuitry to provide a first value that corresponds to a number of CPU cache misses that occur over each of a plurality of time intervals; and second counter circuitry to provide a second value that corresponds to a number of data translation lookaside buffer (DTLB) load misses that occur over each of the plurality of time intervals. The CPU may further include: control circuitry to: receive from the performance monitoring circuitry data representative of the first value and data representative of the second value; calculate a CPU cache miss/DTLB load miss ratio based on the first value divided by the sum of the first value and the second value; identify a trend based on the CPU cache miss/DTLB load miss ratio over the plurality of time intervals; and generate an output indicative of a side channel exploit execution responsive to an identification of a deviation in the trend based on the CPU cache miss/DTLB load miss ratio.

FIG. 1 is a block diagram of a system 100 that includes illustrative central processing unit (CPU) 110 that includes performance monitoring circuitry 120, control circuitry 130, and machine learning circuitry 140, in accordance with at least one embodiment described herein. As depicted in FIG. 1, the performance monitoring circuitry 120 includes first counter circuitry 122 used to provide the CPU cache miss counter and second counter circuitry 124 used to provide the data translation lookaside buffer (DTLB) load miss counter. In embodiments, the first counter circuitry 122 monitors, tracks, and/or counts the number of CPU cache misses. In embodiments, the second counter circuitry 124 monitors, tracks, and/or counts the number of DTLB load misses. Upon detecting an overflow of either (or both) the CPU cache miss counter and/or the DTLB load miss counter, the performance monitoring circuitry 120 may generate an interrupt that causes the transfer of first count data from the first counter circuitry 122 and second count data from the second counter circuitry 124 to the control circuitry 130.

The control circuitry 130 receives the first count data (i.e., the CPU cache miss count 132) from the first counter circuitry 122 and the second count data (i.e., the DTLB load miss count 134) from the second counter circuitry 124. In embodiments, the control circuitry 130 may store all or a portion of the received CPU cache miss count 132 and/or the DTLB load miss count 134 in a memory location and/or storage device. In embodiments, the control circuitry 130 may organize the received first count data and the second count data into a plurality of temporal intervals $138_1$-$138_n$ (collectively, "temporal intervals 138"). For each of at least some of the temporal intervals $138_1$-$138_n$, the control circuitry 130 may determine a respective CPU cache miss count to DTLB load miss count ratio $136_1$-$136_n$. In embodiments, the control circuitry 130 may detect a trend or pattern in the CPU cache miss count to DTLB load miss count ratios $136_1$-$136_n$. The control circuitry 130 may detect pattern deviations and/or statistically significant trend deviations in the CPU cache miss count to DTLB load miss count ratios $136_1$-$136_n$ and may generate one or more output signals that include information indicative of a potential side-channel exploit attack based on the detected pattern or trend deviation in the CPU cache miss count to DTLB load miss count ratio 136 occurring in at least some of the one or more temporal intervals 138.

In embodiments, each of the plurality of temporal intervals 138 may be sequentially or serially arranged (i.e., without intervening temporal spaces). In other embodiments, each of the plurality of temporal intervals 138 may be spaced apart, with fixed or variable intervening temporal spaces. Each of the plurality of temporal intervals 138 may have the same or a different duration. For example, each of the temporal intervals included in the plurality of temporal intervals may have a duration of: about 10 milliseconds (ms) or less; about 25 ms or less; about 50 ms or less; about 100 ms or less; about 250 ms or less; or about 500 ms or less.

The CPU 110 may include any number and/or combination of currently available and/or future developed single- or multi-core central processing units. In embodiments, the CPU 110 may include a general-purpose processor, such as a Core® i3, i5, i7, 2 Duo and Quad, Xeon®, Itanium®, Atom®, or Quark® microprocessor, available from Intel® (Intel Corporation, SANTA CLARA, CA), Alternatively, the CPU 110 may include one or more processors from another manufacturer or supplier, such as Advanced Micro Devices (AMD®, Inc.), ARM Holdings® Ltd, MIPS®, etc. The CPU 110 may include a special-purpose processor, such as, for example, a network or communication processor, compression engine, graphics processor, co-processor, embedded processor, or the like. The CPU 110 may be implemented as a single semiconductor package or as a combination of stacked or otherwise interconnected semiconductor packages and/or dies. The CPU 110 may be a part of and/or may be implemented on one or more substrates using any of a number of process technologies, such as, for example, BiCMOS, CMOS, or NMOS.

The performance monitoring circuitry 120 may include any number and/or combination of any currently available or future developed electronic devices and/or semiconductor components capable of monitoring one or more performance aspects and/or parameters of the CPU 110. The performance monitoring circuitry 120 may have any number and/or combination of event counters. In embodiments, the performance monitoring circuitry 120 may include first counter circuitry 122 to monitor, track, and/or count CPU cache misses and second counter circuitry 124 to monitor, track, and/or count DTLB load misses. For example, in an Intel® CPU the performance monitoring circuitry 120 may be at least partially included or otherwise embodied in a Performance Monitoring Unit (PMU). Within the PMU, the CYCLE_ACTIVITY.STALLS_L3_MISS counter may provide some or all of the first counter circuitry 122 that provides the data representative of the CPU cache miss count $132_1$-$132_n$ to the control circuitry 130. Also within the PMU, the DTLB_LOAD_MISSES.WALK_PENDING counter may provide some or all of the second counter circuitry 124 that provides the data representative of the DTLB load miss count $134_1$-$134_n$ to the control circuitry 130.

In some implementations, the performance monitoring circuitry 120 may include one or more configurable or programmable elements, such as one or more configurable integrated circuits, capable of executing machine-readable instruction sets that cause the configurable or programmable elements to combine in a particular manner to create the performance monitoring circuitry 120. In some implementations, the performance monitoring circuitry 120 may include one or more stand-alone devices or systems, for example, the performance monitoring circuitry 120 may be embodied in a single surface- or socket-mount integrated circuit. In other implementations, the performance monitoring circuitry 120 may be provided in whole or in part via one or more processors, controllers, digital signal processors (DSPs), reduced instruction set computers (RISCs), systems-on-a-chip (SOCs), application specific integrated circuits (ASICs) capable of providing all or a portion of the host CPU 110.

The first counter circuitry 122 may include any number and/or combination of currently available and/or future developed electrical components, semiconductor devices, and/or logic elements capable of monitoring, tracking, and/or counting CPU cache misses. In at least some embodiments, the first counter circuitry 122 may include circuitry capable of monitoring, tracking, and/or counting CPU level 3 (L3) cache misses. In embodiments, the first counter circuitry 122 may communicate information and/or data indicative of the CPU cache miss count 132 either directly to the control circuitry 130 or indirectly to the control circuitry 130 via the performance monitoring circuitry 120. In at least some embodiments, upon occurrence of an overflow condition, the first counter circuitry 122 may provide one or more signals indicative of the overflow condition to the performance monitoring circuitry 120.

The second counter circuitry 124 may include any number and/or combination of currently available and/or future developed electrical components, semiconductor devices, and/or logic elements capable of monitoring, tracking, and/or counting Data Translation Lookaside Buffer (DTLB) load misses. In embodiments, the second counter circuitry 124 may communicate information and/or data indicative of the DTLB load miss count 134 either directly to the control circuitry 130 or indirectly to the control circuitry 130 via the performance monitoring circuitry 120. In at least some embodiments, upon occurrence of an overflow condition, the second counter circuitry 122 may provide one or more signals indicative of the overflow condition to the performance monitoring circuitry 120.

The control circuitry 130 may include any number and/or combination of currently available and/or future developed electrical components, semiconductor devices, and/or logic elements capable of receiving data representative of a count of CPU cache misses and data representative of a count of DTLB load misses from the performance monitoring circuitry 120, calculating one or more CPU cache miss to DTLB load miss ratios $136_1$-$136_n$ for each respective one of at least some of a plurality of temporal intervals $138_1$-$138_n$, detecting deviations or abnormalities in the pattern or trend of DTLB load miss ratios 136, and generating one or more signals indicative of a potential side-channel exploit attack responsive to detecting a deviation and/or abnormality in the pattern or trend of CPU cache miss to DTLB load miss ratios 136. In embodiments, the control circuitry 130 may be formed by the execution of machine-readable instruction sets associated with an application and/or service executed in ring 3 user space. In embodiments, the performance monitoring circuitry 120 may provide some or all of the control circuitry 130. In other embodiments, the CPU 110 may provide some or all of the control circuitry 130 upon executing one or more machine readable instruction sets.

Although not depicted in FIG. 1, in embodiments, a memory or similar storage device may be coupled to the control circuitry 130. The control circuitry 130 may cause the storage of some or all of the received data representative of: the CPU cache miss counts $132_1$-$132_n$; the DTLB load miss count $134_1$-$134_n$; and/or the CPU cache miss to DTLB load miss ratios $136_1$-$136_n$ in the memory or storage device. In at least some embodiments, some or all of the data stored in the memory or storage device may be accessible to a system user.

In at least some embodiments, the CPU 110 may additionally include machine learning circuitry 140. The machine learning circuitry 140 may be directly or indirectly coupled to the control circuitry 130. In embodiments, the machine learning circuitry 140 may train the control circuitry 130 to identify patterns (e.g., perform pattern recognition) and/or determine trends using at least some of the CPU cache miss to DTLB load miss ratios $136_1$-$136_n$. In embodiments, one or more training data sets may be used by the machine learning circuitry 140 to generate a model representative of a pattern or trend in the CPU cache miss to DTLB load miss ratios $136_1$-$136_n$. In such embodiments, the control circuitry 130 may use at least some of the model representative of a pattern or trend in the CPU cache miss to DTLB load miss ratio to identify, in real-time or near real-time, deviations in the pattern or trend formed by the CPU cache miss to DTLB load miss ratio 136.

Figure 2A:
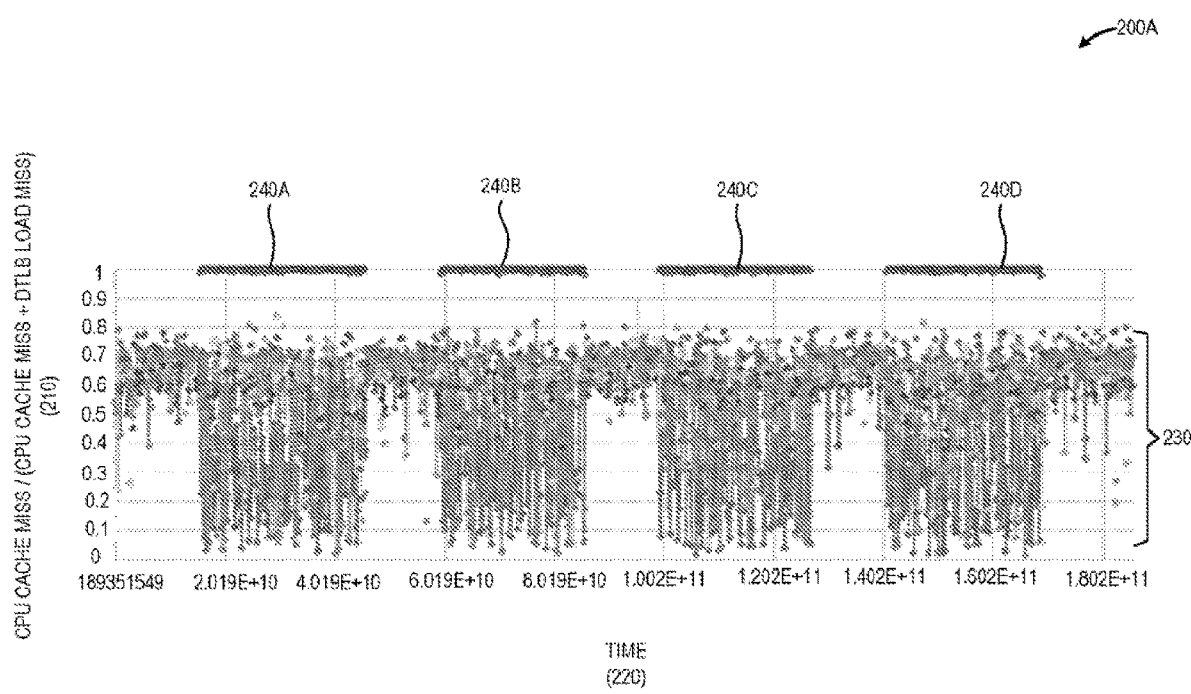
FIG. 2A is a graphical representation of a normalized CPU cache miss to DTLB load miss ratio as a function of time as a system in an idle state undergoes a side-channel exploit attack (Spectre), in accordance with at least one embodiment described herein.

FIG. 2A is a graphical representation 200A of a normalized CPU cache miss to DTLB load miss ratio 210 as a function of time 220 as a system undergoes a side-channel exploit attack (Spectre), in accordance with at least one embodiment described herein. In the embodiment depicted in FIG. 2A, four distinct time intervals 240A, 240B, 240C, and 240D exist when the side-channel exploit attack causes the normalized CPU cache miss to DTLB load miss ratio 210 to separate from the normalized CPU cache miss to DTLB load miss ratio 230 that occurs as the CPU idles.

In such an embodiment, upon detecting the increase in the CPU cache miss to DTLB load miss ratio, the performance monitoring circuitry 120 generates an interrupt that causes the communication of information representative of the CPU cache miss count 122 and the DTLB load miss count 124 to the control circuitry 130. The control circuitry 130 determines the CPU cache miss to DTLB load miss ratio $136_1$-$136_n$ for each of a plurality of time intervals $138_1$-$138_n$. The control circuitry 130, upon detecting the elevated CPU cache miss to DTLB load miss ratio, the control circuitry 130 may generate an alert indicative of a potential side-channel exploit attack.

Figure 2B:
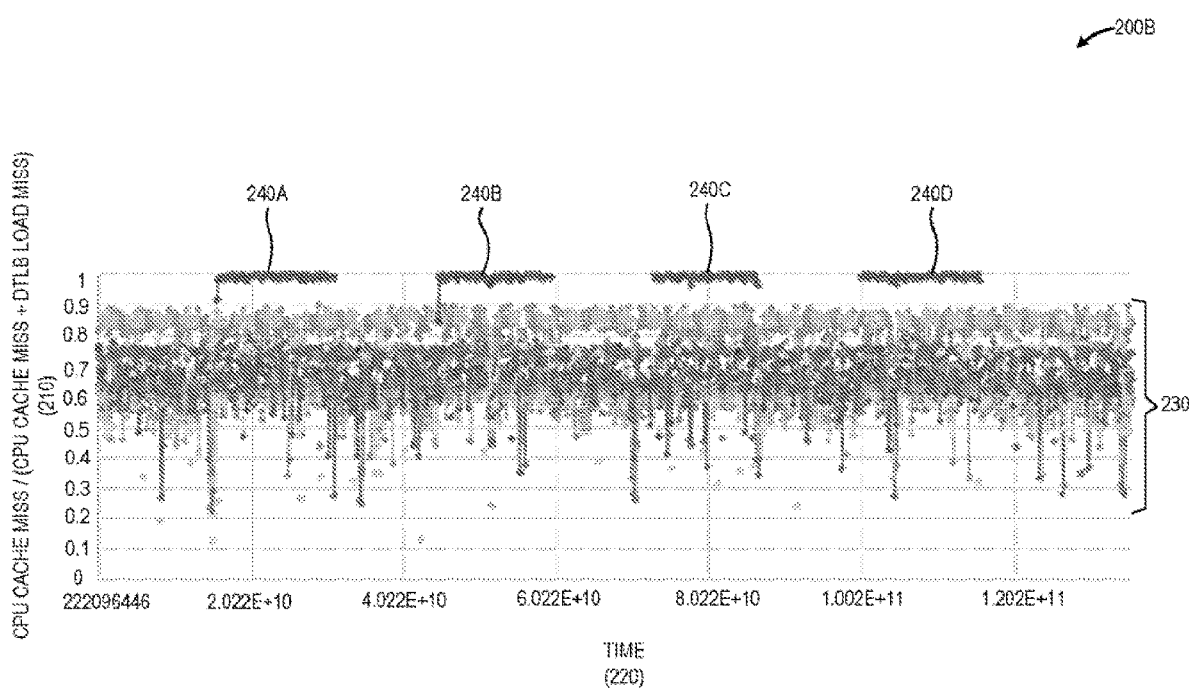
FIG. 2B is a graphical representation of a normalized CPU cache miss to DTLB load miss ratio as a function of time as a system executing a video stream undergoes a side-channel exploit attack (Spectre), in accordance with at least one embodiment described herein.

FIG. 2B is a graphical representation 200B of a normalized CPU cache miss to DTLB load miss ratio 210 as a function of time 220 as a system undergoes a side-channel exploit attack (Spectre), in accordance with at least one embodiment described herein. In the embodiment depicted in FIG. 2B, four distinct time intervals 240A, 240B, 240C, and 240D exist when the side-channel exploit attack causes the normalized CPU cache miss to DTLB load miss ratio 210 to separate from the normalized CPU cache miss to DTLB load miss ratio 230 that occurs as the CPU executes instructions associated with provision of a video presentation (e.g., a Youtube® video).

As before, upon detecting the increase in the CPU cache miss count and/or the DTLB load miss count, the performance monitoring circuitry 120 generates an interrupt that causes the communication of information representative of the CPU cache miss count 122 and the DTLB load miss count 124 to the control circuitry 130. In embodiments, the performance monitoring circuitry 120 may generate the interrupt when either or both the CPU cache miss count and/or the DTLB load miss count exceeds one or more user or system configurable count thresholds. The control circuitry 130 determines the CPU cache miss to DTLB load miss ratio $136_1$-$136_n$ for each of a plurality of time intervals $138_1$-$138_n$. The control circuitry 130, upon detecting the elevated CPU cache miss to DTLB load miss ratio, the control circuitry 130 may generate an alert indicative of a potential side-channel exploit attack.

Figure 2C:
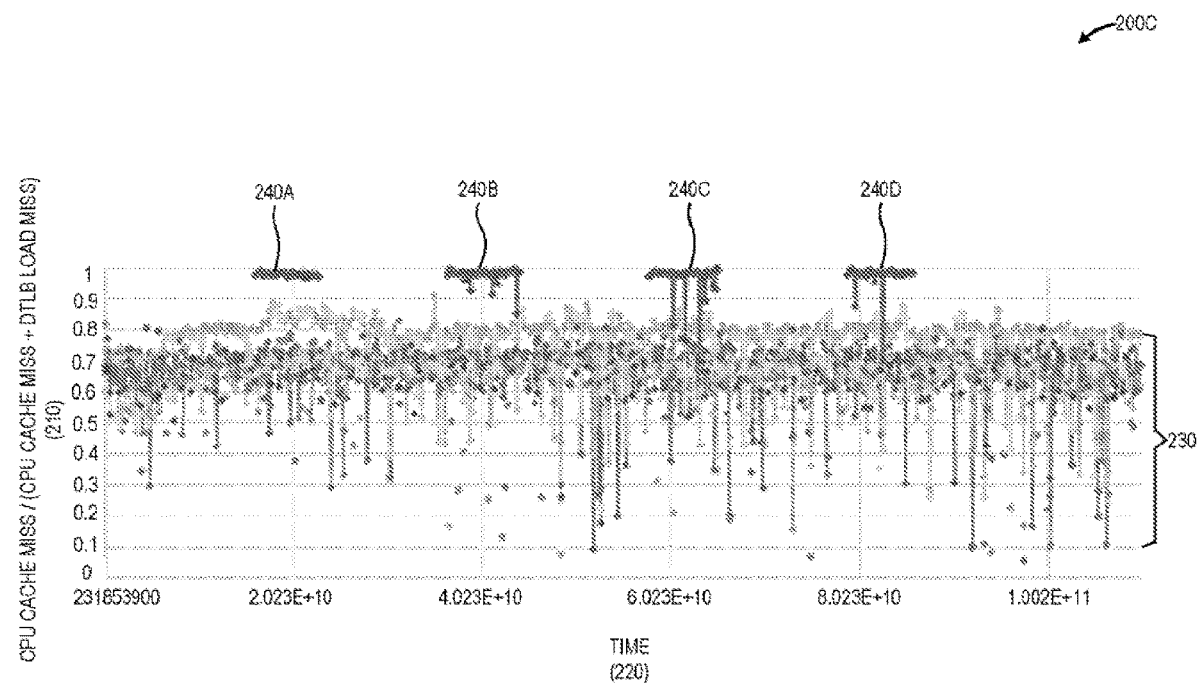
FIG. 2C is a graphical representation of a normalized CPU cache miss to DTLB load miss ratio as a function of time as a system undergoes a side-channel exploit attack (Spectre), in accordance with at least one embodiment described herein.

FIG. 2C is a graphical representation 200C of a normalized CPU cache miss to DTLB load miss ratio 210 as a function of time 220 as a system undergoes a side-channel exploit attack (Spectre), in accordance with at least one embodiment described herein. In the embodiment depicted in FIG. 2C, four distinct time intervals 240A, 240B, 240C, and 240D exist when the side-channel exploit attack causes the normalized CPU cache miss to DTLB load miss ratio 210 to separate from the normalized CPU cache miss to DTLB load miss ratio 230 that occurs as the CPU executes instructions associated with a graphics intensive application (e.g., a Minecraft® game).

As before, upon detecting the increase in the CPU cache miss count and/or the DTLB load miss count, the performance monitoring circuitry 120 generates an interrupt that causes the communication of information representative of the CPU cache miss count 122 and the DTLB load miss count 124 to the control circuitry 130. In embodiments, the performance monitoring circuitry 120 may generate the interrupt when either or both the CPU cache miss count and/or the DTLB load miss count exceeds one or more user or system configurable count thresholds. The control circuitry 130 determines the CPU cache miss to DTLB load miss ratio $136_1$-$136_n$ for each of a plurality of time intervals $138_1$-$138_n$. The control circuitry 130, upon detecting the elevated CPU cache miss to DTLB load miss ratio, the control circuitry 130 may generate an alert indicative of a potential side-channel exploit attack.

Figure 3:
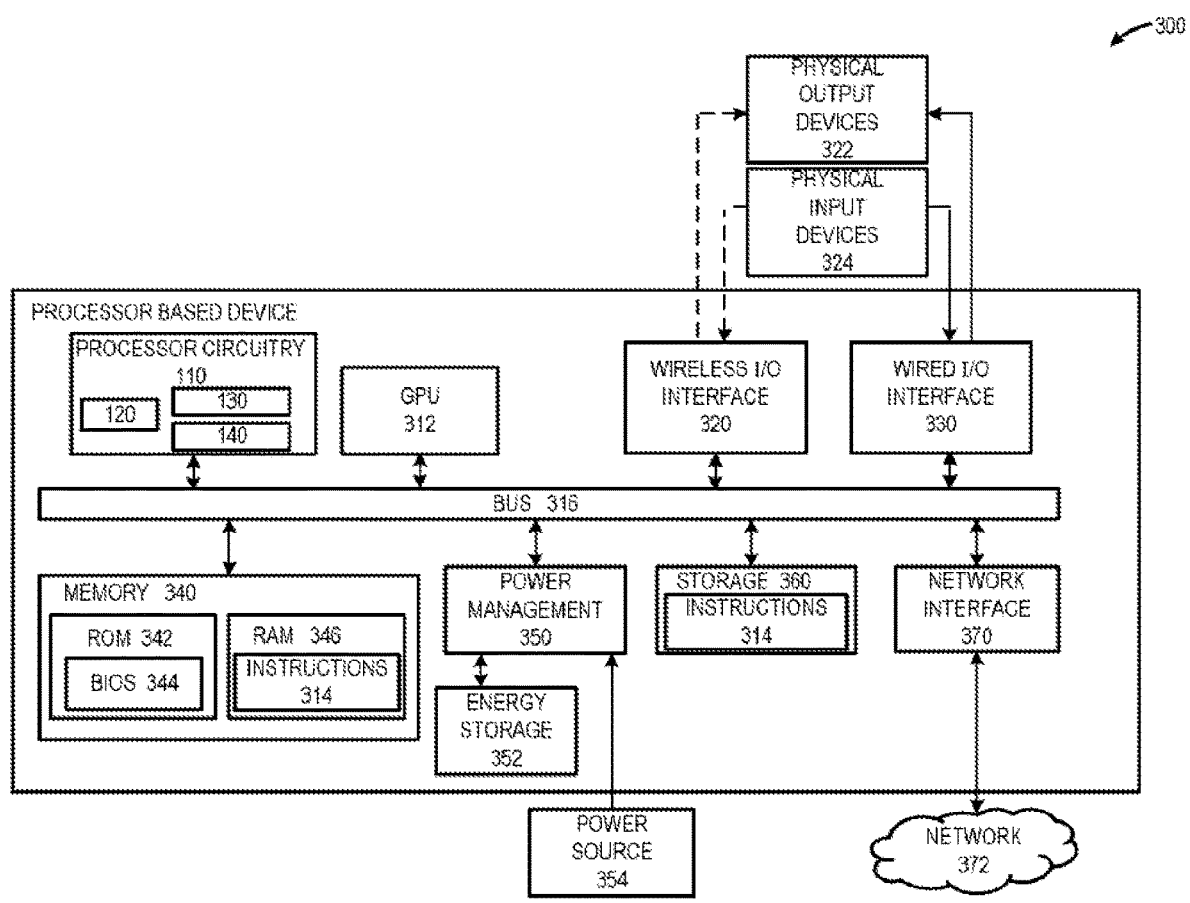
FIG. 3 is a schematic diagram of an illustrative electronic, processor-based, device that includes processor circuitry that includes performance monitoring circuitry, control circuitry and machine learning circuitry, in accordance with at least one embodiment described herein.

FIG. 3 is a schematic diagram of an illustrative electronic, processor-based, device 300 that includes processor circuitry 110 that includes performance monitoring circuitry 120, control circuitry 130 and machine learning circuitry 140, in accordance with at least one embodiment described herein. The processor-based device 300 may additionally include one or more of the following: a graphical processing unit 312, a wireless input/output (I/O) interface 320, a wired I/O interface 330, memory circuitry 340, power management circuitry 350, non-transitory storage device 360, and a network interface 370. The following discussion provides a brief, general description of the components forming the illustrative processor-based device 300. Example, non-limiting processor-based devices 300 may include: smartphones, wearable computers, portable computing devices, handheld computing devices, desktop computing devices, blade server devices, workstations, and similar.

The processor-based device 300 includes processor circuitry 110 that includes performance monitoring circuitry 120, control circuitry 130, and machine learning circuitry 140. In embodiments, the processor-based device 300 may additionally include graphics processor circuitry 312. In embodiments, the processor-based device 300 includes processor circuitry 110 capable of executing machine-readable instruction sets 314, reading data and/or instruction sets 314 from one or more storage devices 360 and writing data to the one or more storage devices 360. In some embodiments, the processor-based device 300 includes graphics processor circuitry 312 capable of executing machine-readable instruction sets 314 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor circuitry 110 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 300 includes a bus or similar communications link 316 that communicably couples and facilitates the exchange of information and/or data between various system components including the processor circuitry 110, the graphics processor circuitry 312, one or more wireless I/O interfaces 320, one or more wired I/O interfaces 330, one or more storage devices 360, and/or one or more network interfaces 370. The processor-based device 300 may be referred to in the singular herein, but this is not intended to limit the embodiments to a single processor-based device 300, since in certain embodiments, there may be more than one processor-based device 300 that incorporates, includes, or contains any number of communicably coupled, collocated, or remote networked circuits or devices.

The processor circuitry 110 may include any number, type, or combination of currently available or future developed devices capable of executing machine-readable instruction sets. The processor circuitry 110 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 3 are of conventional design. Consequently, such blocks need not be described in further detail herein, as they will be understood by those skilled in the relevant art. The bus 316 that interconnects at least some of the components of the processor-based device 300 may employ any currently available or future developed serial or parallel bus structures or architectures.

The system memory 340 may include read-only memory ("ROM") 342 and random access memory ("RAM") 346. A portion of the ROM 342 may be used to store or otherwise retain a basic input/output system ("BIOS") 344. The BIOS 344 provides basic functionality to the processor-based device 300, for example by causing the processor circuitry 110 to load and/or execute one or more machine-readable instruction sets 314. In embodiments, at least some of the one or more machine-readable instruction sets 314 cause at least a portion of the processor circuitry 110 to provide, create, produce, transition, and/or function as a dedicated, specific, and particular machine, for example a word processing machine, a digital image acquisition machine, a media playing machine, a gaming system, a communications device, a smartphone, or similar.

The processor-based device 300 may include at least one wireless input/output (I/O) interface 320. The at least one wireless I/O interface 320 may be communicably coupled to one or more physical output devices 322 (tactile devices, video displays, audio output devices, hardcopy output devices, etc.). The at least one wireless I/O interface 320 may communicably couple to one or more physical input devices 324 (pointing devices, touchscreens, keyboards, tactile devices, etc.). The at least one wireless I/O interface 320 may include any currently available or future developed wireless I/O interface. Example wireless I/O interfaces include, but are not limited to: BLUETOOTH®, near field communication (NFC), and similar.

The processor-based device 300 may include one or more wired input/output (I/O) interfaces 330. The at least one wired I/O interface 330 may be communicably coupled to one or more physical output devices 322 (tactile devices, video displays, audio output devices, hardcopy output devices, etc.). The at least one wired I/O interface 330 may be communicably coupled to one or more physical input devices 324 (pointing devices, touchscreens, keyboards, tactile devices, etc.). The wired I/O interface 330 may include any currently available or future developed I/O interface. Example wired I/O interfaces include, but are not limited to: universal serial bus (USB), IEEE 1394 ("Fire-Wire"), and similar.

The processor-based device 300 may include one or more communicably coupled, non-transitory, data storage devices 360. The data storage devices 360 may include one or more hard disk drives (HDDs) and/or one or more solid-state storage devices (SSDs). The one or more data storage devices 360 may include any current or future developed storage appliances, network storage devices, and/or systems. Non-limiting examples of such data storage devices 360 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 360 may include one or more removable storage devices, such as one or more flash drives, flash memories, flash storage units, or similar appliances or devices capable of communicable coupling to and decoupling from the processor-based device 300.

The one or more data storage devices 360 may include interfaces or controllers (not shown) communicatively coupling the respective storage device or system to the bus 316. The one or more data storage devices 360 may store, retain, or otherwise contain machine-readable instruction sets, data structures, program modules, data stores, databases, logical structures, and/or other data useful to the processor circuitry 110 and/or graphics processor circuitry 312 and/or one or more applications executed on or by the processor circuitry 110 and/or graphics processor circuitry 312. In some instances, one or more data storage devices 360 may be communicably coupled to the processor circuitry 110, for example via the bus 316 or via one or more wired communications interfaces 330 (e.g., Universal Serial Bus or USB); one or more wireless communications interfaces 320 (e.g., Bluetooth®, Near Field Communication or NFC); and/or one or more network interfaces 370 (IEEE 802.3 or Ethernet, IEEE 802.11, or WiFi®, etc.).

Processor-readable instruction sets 314 and other programs, applications, logic sets, and/or modules may be stored in whole or in part in the system memory 340. Such instruction sets 314 may be transferred, in whole or in part, from the one or more data storage devices 360. The instruction sets 314 may be loaded, stored, or otherwise retained in system memory 340, in whole or in part, during execution by the processor circuitry 110 and/or graphics processor circuitry 312. The processor-readable instruction sets 314 may include machine-readable and/or processor-readable code, instructions, or similar logic capable of providing the speech coaching functions and capabilities described herein.

The processor-based device 300 may include power management circuitry 350 that controls one or more operational aspects of the energy storage device 352. In embodiments, the energy storage device 352 may include one or more primary (i.e., non-rechargeable) or secondary (i.e., rechargeable) batteries or similar energy storage devices. In embodiments, the energy storage device 352 may include one or more supercapacitors or ultracapacitors. In embodiments, the power management circuitry 350 may alter, adjust, or control the flow of energy from an external power source 354 to the energy storage device 352 and/or to the processor-based device 300. The power source 354 may include, but is not limited to, a solar power system, a commercial electric grid, a portable generator, an external energy storage device, or any combination thereof.

For convenience, the processor circuitry 110, the graphics processor circuitry 312, the wireless I/O interface 320, the wired I/O interface 330, the power management circuitry 350, the storage device 360, and the network interface 370 are illustrated as communicatively coupled to each other via the bus 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In another example, one or more of the above-described components may be integrated into the processor circuitry 110 and/or the graphics processor circuitry 312. In some embodiments, all or a portion of the bus 316 may be omitted and the components are coupled directly to each other using suitable wired or wireless connections.

Figure 4:
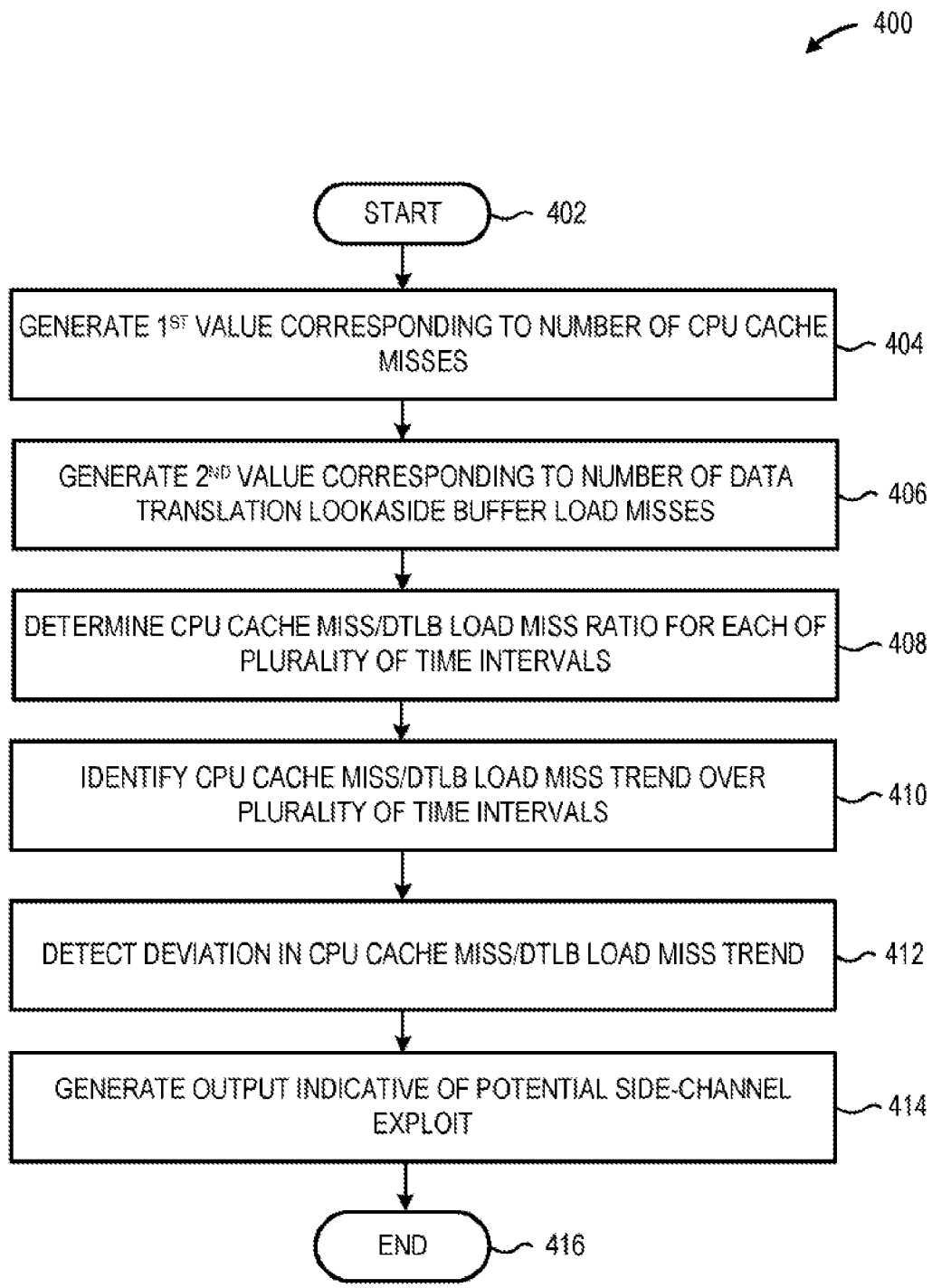
FIG. 4 is a flow diagram of an illustrative side-channel exploit detection method, in accordance with at least one embodiment described herein.

FIG. 4 is a flow diagram of an illustrative side-channel exploit detection method 400, in accordance with at least one embodiment described herein. The performance monitoring circuitry 120 gathers information on one or more system parameters at the kernel (ring 0) level. The performance monitoring circuitry 120 includes a first counter to track CPU cache misses (e.g., the CYCLE_ACTIVITY.STALLS_L3_MISS counter) and a second counter to track DTLB load misses (e.g., the DTLB_LOAD_MISSES.WALK_PENDING counter). Advantageously, the ratio 136 of the CPU cache misses to the DTLB load misses provides a readily accessible indicator of an occurrence of a side-channel exploit attack, such as Spectre or Meltdown. Control circuitry 130 monitors the CPU cache miss to DTLB load miss ratio 136. Using pattern recognition and/or trend analysis, at times enhanced by machine learning, the control circuitry 130 analyzes the CPU cache miss to DTLB load miss ratio 136, recognizes a sharp increase in the ratio (Ref. FIGS. 2A-2C, discussed above) indicative of a side-channel exploit attack and generates an alert to the system user or administrator. The method commences at 402.

At 404, the performance monitoring circuitry 120 generates information and/or data representative of a CPU cache miss count. In embodiments, first counter circuitry 122 within the performance monitoring circuitry 120 may monitor, track, and/or count the number of CPU cache misses over one or more of a plurality of temporal intervals $138_1$-$138n$. In at least some embodiments, the performance monitoring circuitry 120 may track the CPU cache miss count 132 using the CYCLE_ACTIVITY.STALLS_L3_MISS counter to provide all or a portion of the first counter circuitry 122.

At 406, the performance monitoring circuitry 120 generates information and/or data representative of a DTLB load miss count. In embodiments, second counter circuitry 124 within the performance monitoring circuitry 120 may monitor, track, and/or count the number of DTLB load misses over one or more of a plurality of temporal intervals $138_1$-$138n$. In at least some embodiments, the performance monitoring circuitry 120 may track the DTLB load miss count 134 using the DTLB_LOAD_MISSES.WALK_PENDING counter to provide all or a portion of the second counter circuitry 124.

At 408, control circuitry 130 receives information indicative of the CPU cache miss count 132 and the DTLB load miss count 134 from the performance monitoring circuitry 120. In some implementations, the control circuitry 130 may include one or more background applications executed in the user space of the host system (e.g., at ring 3). The control circuitry 130 determines the CPU cache miss to DTLB load miss ratio $136_1$-$136_n$ for each of a respective plurality of temporal intervals $138_1$-$138_n$. In embodiments, each of the plurality of temporal intervals 138 may have the same temporal duration or a different duration. In embodiments, each of the plurality of temporal intervals 138 may be sequentially or serially arranged. In embodiments, the control circuitry may determine the CPU cache miss to DTLB load miss ratio 136 according to the following equation:

Counter Correlation Ratio=CPU Cache Miss Count/
(CPU Cache Miss Count+DTLB Load Miss
Count) (2)

At 410, the control circuitry 130 monitors the CPU cache miss to DTLB load miss ratio $136_1$-$136_n$ over a respective plurality of temporal intervals $138_1$-$138_n$. Using the acquired CPU cache miss to DTLB load miss ratio 136 information, the control circuitry 130 identifies one or more patterns or trends in the CPU cache miss to DTLB load miss ratio 136 indicative of "normal" system operation.

In some instances, machine learning circuitry 140 may train the control circuitry 130 in pattern recognition and/or trend analysis using any currently available machine learning technique applicable to pattern recognition and/or trend analysis. For example, the machine learning circuitry 140 may train the control circuitry 130 in pattern recognition methods using one or more of the following: parametric classification algorithms (linear discriminant analysis, quadratic discriminant analysis, etc.); non-parametric classification algorithms (decision trees, naïve Bayes classifier, neural networks, etc.); clustering algorithms (hierarchical clustering, K-means clustering, correlation clustering, etc.); ensemble learning algorithms (bootstrap aggregating, ensemble averaging, etc.); general algorithms (Bayesian networks, Markov random fields, etc.); or, multilinear subspace learning algorithms (multilinear principle component analysis, etc.).

At 412, the control circuitry 130 detects a deviation in the identified pattern or trend in the CPU cache miss to DTLB load miss ratio $136_1$-$136_n$ over or across all or a portion of one or more of the plurality of temporal intervals $138_1$-$138_n$. For example, the control circuitry 130 may detect a sudden increase or decrease in the CPU cache miss to DTLB load miss ratio 136 over one or more of the plurality of temporal intervals $138_1$-$138_n$.

At 414, responsive to detecting a deviation in the identified pattern or trend in the CPU cache miss to DTLB load miss ratio $136_1$-$136_n$ over or across all or a portion of one or more of the plurality of temporal intervals $138_1$-$138_n$, the control circuitry 130 generates an alert indicative of a potential side-channel exploit attack. The method 400 concludes at 416.

Figure 5:
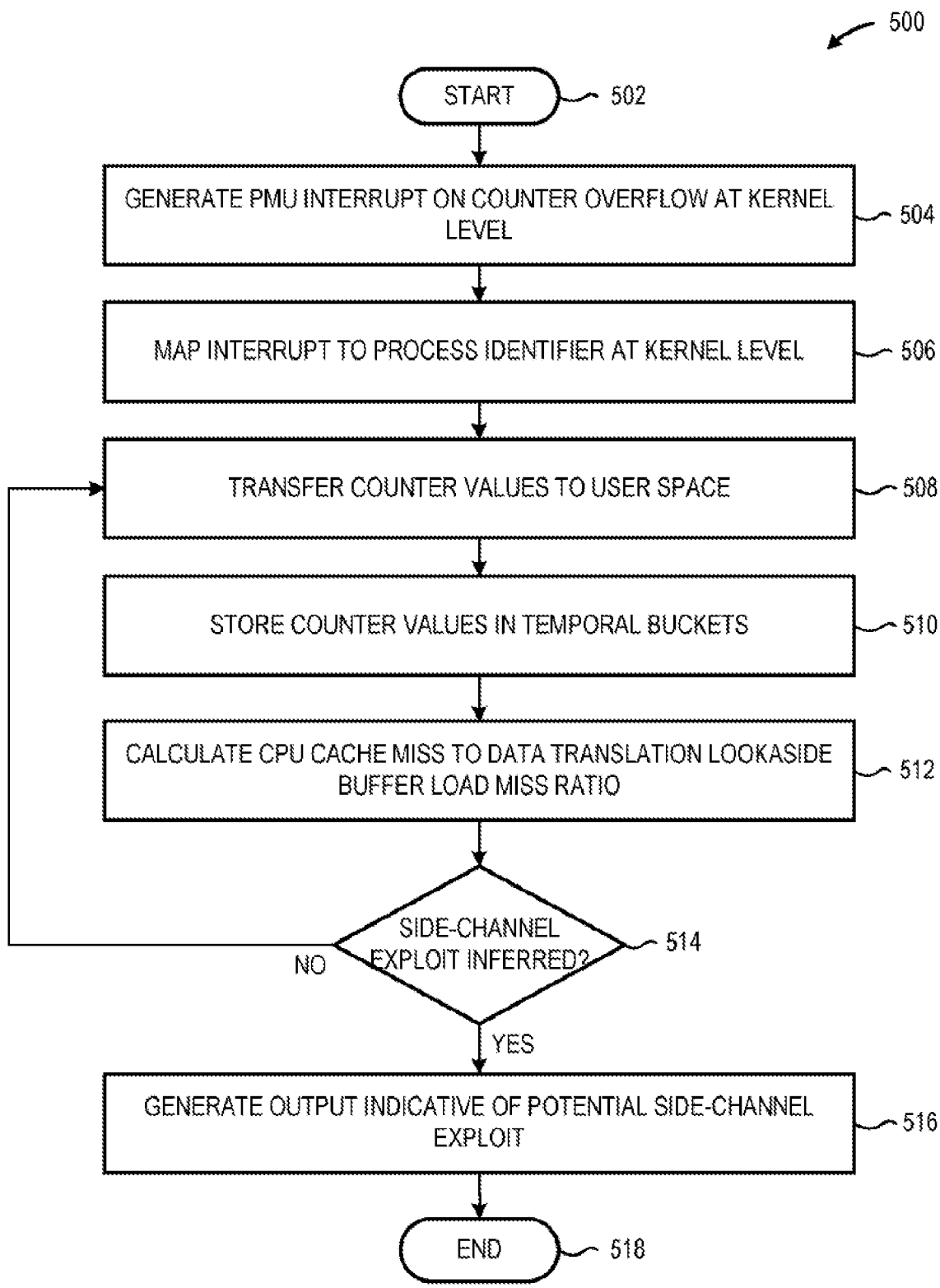
FIG. 5 is a flow diagram of an illustrative side-channel exploit detection method, in accordance with at least one embodiment described herein.

FIG. 5 is a flow diagram of an illustrative side-channel exploit detection method 500, in accordance with at least one embodiment described herein. The performance monitoring circuitry 120 gathers information on one or more system parameters at the kernel (ring 0) level. The performance monitoring circuitry 120 includes a first counter to track CPU cache misses (e.g., the CYCLE_ACTIVITY.STALLS_L3_MISS counter) and a second counter to track DTLB load misses (e.g., the DTLB_LOAD_MISSES.WALK_PENDING counter). Upon detecting a counter overflow at the kernel level, the performance monitoring circuitry 120 generates an interrupt and transfers the CPU cache miss count data generated by the first counter circuitry 122 and the DTLB load miss count data generated by the second counter circuitry 124 to control circuitry 130 in the user space (i.e., ring 3). The control circuitry 130 monitors the CPU cache miss to DTLB load miss ratio $136_1$-$136_n$ over a plurality of temporal intervals $138_1$-$138_n$ to detect one or more patterns or trends. Deviations from in the CPU cache miss to DTLB load miss ratio 136 pattern or trend may indicate a potential side-channel exploit attack. The method commences at 502.

At 504, the performance monitoring circuitry 120 generates an interrupt responsive to detecting an overflow condition in either (or both) the first counter circuitry 122 providing the CPU cache miss counter (e.g., the CYCLE_ACTIVITY.STALLS_L3_MISS counter) and/or the second counter circuitry 124 providing the DTLB load miss counter (e.g., the DTLB_LOAD_MISSES.WALK_PENDING counter).

At 506, the performance monitoring circuitry 120 maps the interrupt to a process identifier (PID).

At 508, the performance monitoring circuitry 120 transfers the data representative of the CPU cache miss count 132 and the DTLB load miss count 134 to control circuitry executing at the user (i.e., ring 3) level. In embodiments, the performance monitoring circuitry 120 transfers CPU cache miss count $132_1$-$132_n$ and DTLB load miss count $134_1$-$134_n$ information and/or data to the control circuitry 130 over a respective plurality of temporal intervals $138_1$-$138_n$.

At 510, the control circuitry 130 may store or otherwise retain the received CPU cache miss count $132_1$-$132_n$ and DTLB load miss count $134_1$-$134_n$ information and/or data. In embodiments, the control circuitry 130 may store the received information and/or in temporal buckets or similar data stores and/or data structures that correspond to each of the intervals included in the plurality of temporal intervals $138_1$-$138_n$.

At 512, the control circuitry 130 calculates or otherwise determines a CPU cache miss to DTLB load miss ratio $136_1$-$136_n$ for each of at least some of the plurality of temporal intervals $138_1$-$138_n$. In at least some implementations, the control circuitry 130 may determine the CPU cache miss to DTLB load miss ratio 136 according to the following equation:

Counter Correlation Ratio=CPU Cache Miss Count/ (CPU Cache Miss Count+DTLB Load Miss Count) (3)

In embodiments, the control circuitry 130 may detect a pattern or determine a trend in the calculated CPU cache miss to DTLB load miss ratio $136_1$-$136_n$.

At 514, the control circuitry 130 determines whether a deviation in the detected pattern or determined trend of the CPU cache miss to DTLB load miss ratio 136 indicates a side-channel exploit attack. If the control circuitry 130 determines no evidence of a side-channel exploit attack, the method 500 returns to 506, and the control circuitry 130 receives additional CPU cache miss count 132 and DTLB load miss count 134 information from the performance monitoring circuitry 120. If the control circuitry 130 determines that the deviation in the CPU cache miss to DTLB load miss ratio 136 provides evidence of a side-channel exploit attack, the method 500 continues to 516.

At 516, the control circuitry 130, in response to detecting a deviation indicative of a side-channel exploit attack at 514, generates an output to alert a system user and/or system administrator of the potential side-channel exploit attack. The method 500 concludes at 518.

While FIGS. 4 and 5 illustrate various operations according to one or more embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for detecting side-channel exploit attacks such as Spectre and Meltdown. Performance monitoring circuitry includes first counter circuitry to monitor CPU cache misses and second counter circuitry to monitor DTLB load misses. Upon detecting an excessive number of cache misses and/or load misses, the performance monitoring circuitry transfers the first and second counter circuitry data to control circuitry. The control circuitry determines a CPU cache miss to DTLB load miss ratio for each of a plurality of temporal intervals. The control circuitry the identifies, determines, and/or detects a pattern or trend in the CPU cache miss to DTLB load miss ratio. Upon detecting a deviation from the identified CPU cache miss to DTLB load miss ratio pattern or trend indicative of a potential side-channel exploit attack, the control circuitry generates an output to alert a system user or system administrator.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for detecting side channel exploit attacks.

According to example 1, there is provided a central processing unit (CPU). The CPU may include: performance monitoring circuitry that includes: first counter circuitry to provide a first value that corresponds to a number of CPU cache misses that occur over each of a plurality of time intervals; and second counter circuitry to provide a second value that corresponds to a number of data translation lookaside buffer (DTLB) load misses that occur over each of the plurality of time intervals. The CPU may further include control circuitry to: receive from the performance monitoring circuitry data representative of the first value and data representative of the second value; calculate a CPU cache miss/DTLB load miss ratio based on the first value divided by the sum of the first value and the second value; identify a trend based on the CPU cache miss/DTLB load miss ratio over the plurality of time intervals; and generate an output indicative of a side channel exploit execution responsive to an identification of a deviation in the trend based on the CPU cache miss/DTLB load miss ratio.

Example 2 may include elements of example 1 where the CPU may further include machine learning circuitry, the machine learning circuitry to cause the control circuitry to identify the trend using pattern recognition.

Example 3 may include elements of any of examples 1 or 2 where the first counter circuitry may include counter circuitry to count level 3 (L3) cache misses.

Example 4 may include elements of any of examples 1 through 3 where each of the plurality of time intervals may include an interval of from 1 millisecond to 500 milliseconds.

Example 5 may include elements of any of examples 1 through 4 where the plurality of time intervals may include a plurality of sequential time intervals.

Example 6 may include elements of any of examples 1 through 5 and the performance monitoring circuitry may further: generate an interrupt responsive to an overflow condition in at least one of the first counter circuitry or the second counter circuitry.

Example 7 may include elements of any of examples 1 through 6 where the control circuitry may receive the data representative of the first value and the data representative of the second value from the performance monitoring circuitry responsive to the generation of the interrupt by the performance monitoring circuitry.

According to example 8, there is provided a central processing unit (CPU) side-channel exploit detection method. The method may include: generating, by first counter circuitry, a first value that corresponds to a number of CPU cache misses that occur over each of a plurality of time intervals; generating, by second counter circuitry, a second value that corresponds to a number of data translation lookaside buffer (DTLB) load misses that occur over each of the plurality of time intervals; receiving, by control circuitry, data representative of the first value and data representative of the second value; determining, by the control circuitry, a CPU cache miss/DTLB load miss ratio based on the first value divided by the sum of the first value and the second value; identifying, by the control circuitry, a CPU cache miss/DTLB load miss ratio trend over the plurality of time intervals; detecting, by the control circuitry, a deviation in the CPU cache miss/DTLB load miss ratio trend; and generating, by the control circuitry, an output indicative of a potential execution on of a side-channel exploit responsive to detection of the deviation in the CPU cache miss/DTLB load miss ratio trend.

Example 9 may include elements of example 8 where identifying, by the control circuitry, the CPU cache miss/DTLB load miss ratio trend over the plurality of time intervals may further include: training, via machine learning circuitry, the control circuitry to recognize one or more patterns in the CPU cache miss/DTLB load miss ratio trend over the plurality of time intervals.

Example 10 may include elements of any of examples 8 or 9 where generating, by the first counter circuitry, the first value that corresponds to the number of CPU cache misses that occur over each of the plurality of time intervals may include: generating, by the first counter circuitry, a first value that corresponds to a number of CPU level 3 (L3) cache misses that occur over each of the plurality of time intervals.

Example 11 may include elements of any of examples 8 through 10 where generating, by the first counter circuitry, the first value that corresponds to the number of CPU cache misses that occur over each of the plurality of time intervals may include: generating, by the first counter circuitry, the first value that corresponds to the number of CPU cache misses that occur over each of a plurality of 1 millisecond to 500 millisecond time intervals.

Example 12 may include elements of any of examples 8 through 11 where generating, by the first counter circuitry, the first value that corresponds to the number of CPU cache misses that occur over each of the plurality of 1 millisecond to 500 millisecond time intervals may include: generating, by the first counter circuitry, the first value that corresponds to the number of CPU cache misses that occur over each of a plurality of 1 millisecond to 500 millisecond sequential time intervals.

Example 13 may include elements of any of examples 8 through 12, and the method may further include: generating, by performance monitoring circuitry, an interrupt responsive to an occurrence of an overflow condition in at least one of the first counter circuitry or the second counter circuitry.

Example 14 may include elements of any of examples 8 through 13 where receiving, by the control circuitry, the data representative of the first value and the data representative of the second value may include: receiving, by the control circuitry, the data representative of the first value and the data representative of the second value responsive to the generation of the interrupt by the performance monitoring circuitry.

According to example 15, there is provided a side-channel exploit detection controller. The controller may include: control circuitry; and a storage device coupled to the control circuitry, the storage device including machine-readable instructions that when executed by the control circuitry, cause the control circuitry to: receive, from first counter circuitry, data representative of a first value that corresponds to a number of CPU cache misses that occur over each of a plurality of time intervals; receive, from second counter circuitry, data representative of a second value that corresponds to a number of data translation lookaside buffer (DTLB) load misses that occur over each of the plurality of time intervals; determine a CPU cache miss/DTLB load miss ratio based on the first value divided by the sum of the first value and the second value; identify a CPU cache miss/DTLB load miss ratio trend over the plurality of time intervals; detect a deviation in the CPU cache miss/DTLB load miss ratio trend; and generate an output indicative of a potential execution on of a side-channel exploit responsive to detection of the deviation in the CPU cache miss/DTLB load miss ratio trend.

Example 16 may include elements of example 15 where the instructions that cause the control circuitry to identify a CPU cache miss/DTLB load miss ratio trend over the plurality of time intervals may further cause the control circuitry to: identify a CPU cache miss/DTLB load miss ratio trend over the plurality of time intervals using pattern recognition information received from machine learning circuitry coupled to the control circuitry.

Example 17 may include elements of any of examples 15 or 16 where the instructions that cause the control circuitry to receive, from the first counter circuitry, the data representative of the first value corresponding to the number of CPU cache misses that occur over each of the plurality of time intervals may further cause the control circuitry to: receive, from the first counter circuitry, data representative of a first value that corresponds to a number of CPU level 3 (L3) cache misses that occur over each of the plurality of time intervals.

Example 18 may include elements of any of examples 15 through 17 where the instructions that cause the control circuitry to receive, from the first counter circuitry, the data representative of the first value corresponding to the number of CPU cache misses that occur over each of the plurality of time intervals may further cause the control circuitry to: receive, from the first counter circuitry, the data representative of the first value corresponding to the number of CPU cache misses that occur over each of a plurality of 1 millisecond to 500 millisecond time intervals.

Example 19 may include elements of any of examples 15 through 18 where the instructions that cause the control circuitry to receive, from the first counter circuitry, the data representative of the first value corresponding to the number of CPU cache misses that occur over each of the plurality of 1 millisecond to 500 millisecond time intervals may further cause the control circuitry to: receive, from the first counter circuitry, the data representative of the first value corresponding to the number of CPU cache misses that occur over each of the plurality of 1 millisecond to 500 millisecond sequential time intervals.

Example 20 may include elements of any of examples 15 through 19 where the machine-readable instructions that cause the control circuitry to receive, from the first counter circuitry, the data representative of the first value that corresponds to a number of CPU cache misses that occur over each of the plurality of time intervals may further cause the control circuitry to: receive, from the first counter circuitry, the data representative of the first value that corresponds to a number of CPU cache misses that occur over each of the plurality of time intervals responsive to an occurrence of an overflow condition in at least one of the first counter circuitry or the second counter circuitry.

According to example 21, there is provided a non-transitory machine-readable storage device that includes instructions that, when executed by the control circuitry, cause the control circuitry to: receive, from first counter circuitry, data representative of a first value that corresponds to a number of CPU cache misses that occur over each of a plurality of time intervals; receive, from second counter circuitry, data representative of a second value that corresponds to a number of data translation lookaside buffer (DTLB) load misses that occur over each of the plurality of time intervals; determine a CPU cache miss/DTLB load miss ratio based on the first value divided by the sum of the first value and the second value; identify a CPU cache miss/DTLB load miss ratio trend over the plurality of time intervals; detect a deviation in the CPU cache miss/DTLB load miss ratio trend; and generate an output indicative of a potential execution on of a side-channel exploit responsive to detection of the deviation in the CPU cache miss/DTLB load miss ratio trend.

Example 22 may include elements of example 21 where the instructions that cause the control circuitry to identify a CPU cache miss/DTLB load miss ratio trend over the plurality of time intervals may further cause the control circuitry to: identify a CPU cache miss/DTLB load miss ratio trend over the plurality of time intervals using pattern recognition information received from machine learning circuitry coupled to the control circuitry.

Example 23 may include elements of any of examples 21 or 22 where the instructions that cause the control circuitry to receive, from the first counter circuitry, the data representative of the first value corresponding to the number of CPU cache misses that occur over each of the plurality of time intervals may further cause the control circuitry to: receive, from the first counter circuitry, data representative of a first value that corresponds to a number of CPU level 3 (L3) cache misses that occur over each of the plurality of time intervals.

Example 24 may include elements of any of examples 21 through 23 where the instructions that cause the control circuitry to receive, from the first counter circuitry, the data representative of the first value corresponding to the number of CPU cache misses that occur over each of the plurality of time intervals may further cause the control circuitry to: receive, from the first counter circuitry, the data representative of the first value corresponding to the number of CPU cache misses that occur over each of a plurality of 1 millisecond to 500 millisecond time intervals.

Example 25 may include elements of any of examples 21 through 24 where the instructions that cause the control circuitry to receive, from the first counter circuitry, the data representative of the first value corresponding to the number of CPU cache misses that occur over each of the plurality of 1 millisecond to 500 millisecond time intervals may further cause the control circuitry to: receive, from the first counter circuitry, the data representative of the first value corresponding to the number of CPU cache misses that occur over each of the plurality of 1 millisecond to 500 millisecond sequential time intervals.

Example 26 may include elements of any of examples 21 through 25 where the machine-readable instructions that cause the control circuitry to receive, from the first counter circuitry, the data representative of the first value that corresponds to a number of CPU cache misses that occur over each of the plurality of time intervals may further cause the control circuitry to: receive, from the first counter circuitry, the data representative of the first value that corresponds to a number of CPU cache misses that occur over each of the plurality of time intervals responsive to an occurrence of an overflow condition in at least one of the first counter circuitry or the second counter circuitry.

According to example 27, there is provided a central processing unit (CPU) side-channel exploit detection system. The system may include: means for generating a first value that corresponds to a number of CPU cache misses that occur over each of a plurality of time intervals; means for generating a second value that corresponds to a number of data translation lookaside buffer (DTLB) load misses that occur over each of the plurality of time intervals; means for determining a CPU cache miss/DTLB load miss ratio based on the first value divided by the sum of the first value and the second value; means for identifying a CPU cache miss/DTLB load miss ratio trend over the plurality of time intervals; means for detecting a deviation in the CPU cache miss/DTLB load miss ratio trend; and means for generating an output indicative of a potential execution on of a side-channel exploit responsive to detection of the deviation in the CPU cache miss/DTLB load miss ratio trend.

Example 28 may include elements of example 27 where the means for identifying the CPU cache miss/DTLB load miss ratio trend over the plurality of time intervals may further include: means for training the control circuitry to recognize one or more patterns in the CPU cache miss/DTLB load miss ratio trend over the plurality of time intervals.

Example 29 may include elements of any of examples 27 or 28 where the means for generating the first value that corresponds to the number of CPU cache misses that occur over each of the plurality of time intervals may include: means for generating a first value that corresponds to a number of CPU level 3 (L3) cache misses that occur over each of the plurality of time intervals.

Example 30 may include elements of any of examples 27 through 29 where the means for generating the first value that corresponds to the number of CPU cache misses that occur over each of the plurality of time intervals may include: means for generating the first value that corresponds to the number of CPU cache misses that occur over each of a plurality of 1 millisecond to 500 millisecond time intervals.

Example 31 may include elements of any of examples 27 through 30 where the means for generating the first value that corresponds to the number of CPU cache misses that occur over each of the plurality of 1 millisecond to 500 millisecond time intervals may include: means for generating the first value that corresponds to the number of CPU cache misses that occur over each of a plurality of 1 millisecond to 500 millisecond sequential time intervals.

Example 32 may include elements of any of examples 27 through 31, and the system may further include: means for generating an interrupt responsive to an occurrence of an overflow condition in at least one of the first counter circuitry or the second counter circuitry.

Example 33 may include elements of any of examples 27 through 32 where the means for receiving the data representative of the first value and the data representative of the second value may include: means for receiving the data representative of the first value and the data representative of the second value responsive to the generation of the interrupt.

According to example 34, there is provided an electronic device. The electronic device may include: a printed circuit board; and a central processing unit (CPU) coupled to the printed circuit board, the CPU may include: performance monitoring circuitry that includes: first counter circuitry to provide a first value that corresponds to a number of CPU cache misses that occur over each of a plurality of time intervals; and second counter circuitry to provide a second value that corresponds to a number of data translation lookaside buffer (DTLB) load misses that occur over each of the plurality of time intervals. The CPU may further include: control circuitry to: receive from the performance monitoring circuitry data representative of the first value and data representative of the second value; calculate a CPU cache miss/DTLB load miss ratio based on the first value divided by the sum of the first value and the second value; identify a trend based on the CPU cache miss/DTLB load miss ratio over the plurality of time intervals; and generate an output indicative of a side channel exploit execution responsive to an identification of a deviation in the trend based on the CPU cache miss/DTLB load miss ratio.

Example 35 may include elements of example 34 where the CPU may further include machine learning circuitry, the machine learning circuitry to cause the control circuitry to identify the trend using pattern recognition.

Example 36 may include elements of any of examples 34 or 35 where the first counter circuitry may include counter circuitry to count level 3 (L3) cache misses.

Example 37 may include elements of any of examples 34 through 36 where each of the plurality of time intervals may include an interval of from 1 millisecond to 500 milliseconds.

Example 38 may include elements of any of examples 34 through 37 where the plurality of time intervals may include a plurality of sequential time intervals.

Example 39 may include elements of any of examples 34 through 38 and the performance monitoring circuitry may further: generate an interrupt responsive to an overflow condition in at least one of the first counter circuitry or the second counter circuitry.

Example 40 may include elements of any of examples 34 through 39 where the control circuitry may receive the data representative of the first value and the data representative of the second value from the performance monitoring circuitry responsive to the generation of the interrupt by the performance monitoring circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An apparatus comprising control circuitry to:
    determine, for individual ones of a plurality of time intervals, a ratio based on a first value divided by a sum of the first value and a second value, wherein:
        the first value corresponds to a number of central processing unit (CPU) cache misses over said individual ones of the plurality of time intervals; and
        the second value corresponds to a number of dual/data translation lookaside buffer (DTLB) load misses over said individual ones of the plurality of time intervals;
    identify, based on the ratio, a trend over the plurality of time intervals; and
    responsive to an identification of a deviation in the trend, generate one or more output signals indicative of a side channel exploit execution.

2. The apparatus of claim 1, the control circuitry to receive data representative of the first value and data representative of the second value for said individual ones of the plurality of time intervals.

3. The apparatus of claim 1, the control circuitry to receive signals from a machine learning circuitry to cause the control circuitry to identify the trend using pattern recognition.

4. The apparatus of claim 1, wherein the cache misses include level 3 (L3) cache misses.

5. The apparatus of claim 1, wherein each of the plurality of time intervals comprises an interval of from 1 millisecond to 500 milliseconds.

6. The apparatus of claim 1, wherein the plurality of time intervals comprises a plurality of sequential time intervals.

7. The apparatus of claim 1, wherein the control circuitry is to send for transmission the one or more output signals to at least one of a system user or a system administrator of a system to include the apparatus.

8. The apparatus of claim 1, wherein the apparatus corresponds to a central processing unit.

9. A method to be used at a control circuitry of an electronic system, the method comprising:
  determining, for individual ones of a plurality of time intervals, a ratio based on a first value divided by a sum of the first value and a second value, wherein:
    the first value corresponds to a number of central processing unit (CPU) cache misses over said individual ones of the plurality of time intervals; and
    the second value corresponds to a number of dual/data translation lookaside buffer (DTLB) load misses over said individual ones of the plurality of time intervals;
  identifying, based on the ratio, a trend over the plurality of time intervals; and
  responsive to an identification of a deviation in the trend, generating one or more output signals indicative of a side channel exploit execution.

10. The method of claim 9, further including receiving data representative of the first value and data representative of the second value for said individual ones of the plurality of time intervals.

11. The method of claim 9, further comprising receiving signals from a machine learning circuitry to cause the control circuitry to identify the trend using pattern recognition.

12. The method of claim 9, wherein the cache misses include level 3 (L3) cache misses.

13. The method of claim 9, wherein each of the plurality of time intervals comprises an interval of from 1 millisecond to 500 milliseconds.

14. The method of claim 9, wherein the plurality of time intervals comprises a plurality of sequential time intervals.

15. The method of claim 9, further including sending for transmission the one or more output signals to at least one of a system user or a system administrator of the electronic system.

16. A non-transitory machine-readable storage device that includes instructions that, when executed by a control circuitry of an electronic system, causes the control circuitry to perform operations including:
  determining, for individual ones of a plurality of time intervals, a ratio based on a first value divided by a sum of the first value and a second value, wherein:
    the first value corresponds to a number of central processing unit (CPU) cache misses over said individual ones of the plurality of time intervals; and
    the second value corresponds to a number of dual/data translation lookaside buffer (DTLB) load misses over said individual ones of the plurality of time intervals;
  identifying, based on the ratio, a trend over the plurality of time intervals; and
  responsive to an identification of a deviation in the trend, generating one or more output signals indicative of a side channel exploit execution.

17. The storage device of claim 16, the operations further including receiving data representative of the first value and data representative of the second value for said individual ones of the plurality of time intervals.

18. The storage device of claim 16, the operations further including receiving signals from a machine learning circuitry to cause the control circuitry to identify the trend using pattern recognition.

19. The storage device of claim 16, wherein the cache misses include level 3 (L3) cache misses.

20. The storage device of claim 16, wherein each of the plurality of time intervals comprises an interval of from 1 millisecond to 500 milliseconds.

21. The storage device of claim 16, wherein the plurality of time intervals comprises a plurality of sequential time intervals.

22. The storage device of claim 16, the operations further including sending for transmission the one or more output signals to at least one of a system user or a system administrator of the electronic system.

23. An electronic system including:
  performance monitoring circuitry to:
    determine a first value that corresponds to a number of CPU cache misses that occur over individual ones of a plurality of time intervals; and
    determine a second value that corresponds to a number of dual/data translation lookaside buffer (DTLB) load misses over individual ones of the plurality of time intervals; and
  control circuitry coupled to the performance monitoring circuitry, the control circuitry to:
    receive, for individual ones of the plurality of times intervals, the first value and the second value from the performance monitoring circuitry;
    determine, for said individual ones of a plurality of time intervals, a ratio based on the first value divided by a sum of the first value and the second value;
    identify, based on the ratio, a trend over the plurality of time intervals; and
    responsive to an identification of a deviation in the trend, generate one or more output signals indicative of a side channel exploit execution.

24. The system of claim 23, further including a machine learning circuitry coupled to the control circuitry, the control circuitry to receive signals from the machine learning circuitry to cause the control circuitry to identify the trend using pattern recognition.

25. The system of claim 23, the performance monitoring circuitry further including a first counter circuitry to determine the first value, and a second counter circuitry to determine the second value, the performance monitoring circuitry to generate an interrupt responsive to an overflow condition in at least one of the first counter circuitry or the second counter circuitry.

* * * * *